(12) United States Patent
Kiilerich Pratas et al.

(10) Patent No.: US 12,034,512 B2
(45) Date of Patent: Jul. 9, 2024

(54) METHODS AND APPARATUS FOR DETERMINING BEAM DIRECTIONS AFTER INACTIVE PERIOD

(71) Applicant: NOKIA TECHNOLOGIES OY, Espoo (FI)

(72) Inventors: Nuno Manuel Kiilerich Pratas, Gistrup (DK); Benny Vejlgaard, Gistrup (DK); Simon Svendsen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 259 days.

(21) Appl. No.: 17/594,254

(22) PCT Filed: Apr. 11, 2019

(86) PCT No.: PCT/EP2019/059265
§ 371 (c)(1),
(2) Date: Oct. 7, 2021

(87) PCT Pub. No.: WO2020/207588
PCT Pub. Date: Oct. 15, 2020

(65) Prior Publication Data
US 2022/0190903 A1    Jun. 16, 2022

(51) Int. Cl.
*H04B 7/06* (2006.01)
*H04B 7/08* (2006.01)
*H04W 76/28* (2018.01)

(52) U.S. Cl.
CPC .......... *H04B 7/0695* (2013.01); *H04B 7/088* (2013.01); *H04W 76/28* (2018.02)

(58) Field of Classification Search
CPC ...... H04B 7/0695; H04B 7/088; H04W 76/28
See application file for complete search history.

(56) References Cited

U.S. PATENT DOCUMENTS

| 2013/0040682 A1* | 2/2013 | Chang | H04W 8/24 |
| | | | 342/368 |
| 2016/0099763 A1* | 4/2016 | Chen | H04B 7/063 |
| | | | 370/329 |

(Continued)

FOREIGN PATENT DOCUMENTS

| CN | 109076454 A | 12/2018 |
| CN | 109429551 B | 10/2021 |

(Continued)

OTHER PUBLICATIONS

International Search Report and Written Opinion for International Application No. PCT/EP2019/059265, mailed on Dec. 16, 2019, 11 pages.

(Continued)

*Primary Examiner* — Jean B Corrielus
(74) *Attorney, Agent, or Firm* — Brake Hughes Bellermann LLP

(57) ABSTRACT

A method comprises, when a communications device transitions from an inactive state to an active state, determining one or more antenna radiation beam directions for one or more antenna arrays of the communications device in dependence on movement information associated with the communications device and information from when the communications device was last in an active state.

17 Claims, 13 Drawing Sheets

---

A1- When a communications device transitions from an inactive state to an active state, determine one or more antenna radiation beam directions for one or more antenna arrays of the communications device in dependence on movement information associated with the communications device and information from when the communications device was last in an active state.

(56) References Cited

U.S. PATENT DOCUMENTS

2017/0155439 A1\* 6/2017 Chang .................. H01Q 3/26
2017/0359106 A1 12/2017 John Wilson et al.
2019/0150003 A1\* 5/2019 He ..................... H04B 7/0617
                                                              342/368

FOREIGN PATENT DOCUMENTS

EP        3537625 A1   9/2019
KR    20180060883 A    6/2018
WO     2017164925 A1   9/2017

OTHER PUBLICATIONS

Office Action for European Application No. 19717856.9, mailed on May 17, 2023, 4 pages.
Office Action & Search Report for Chinese Application No. 201980096686.X; mailed on Feb. 27, 2024, 13 pages.

\* cited by examiner

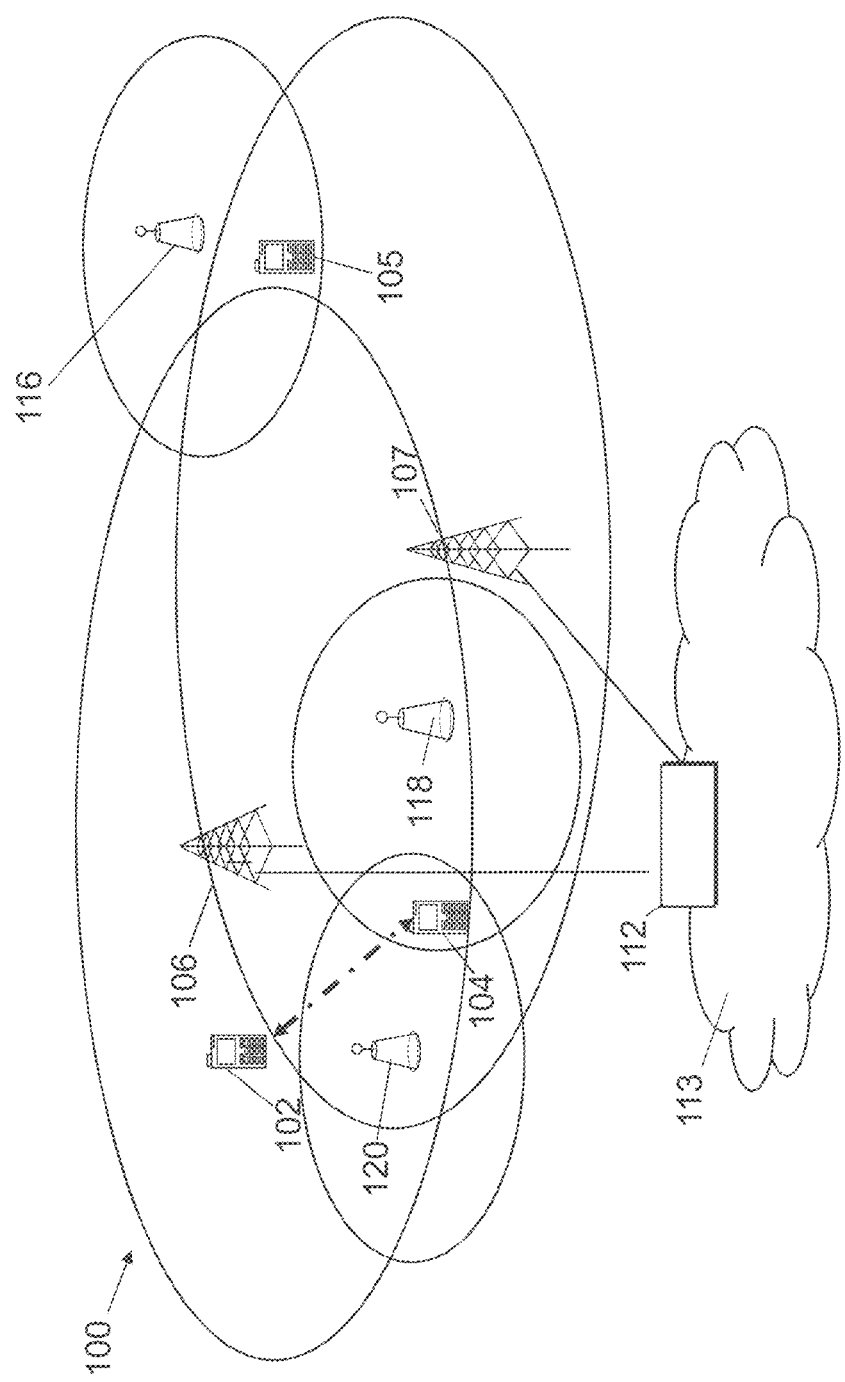

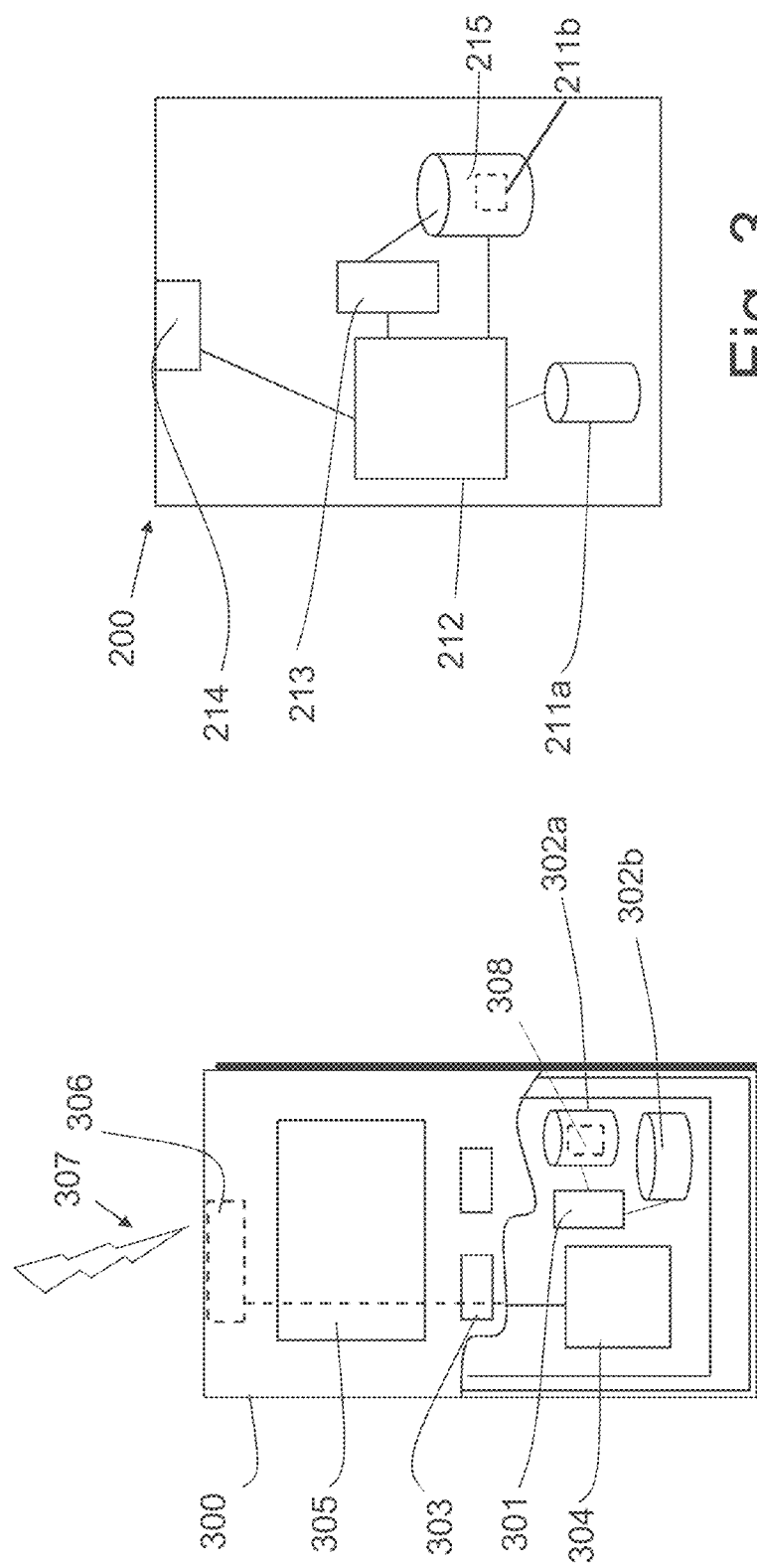

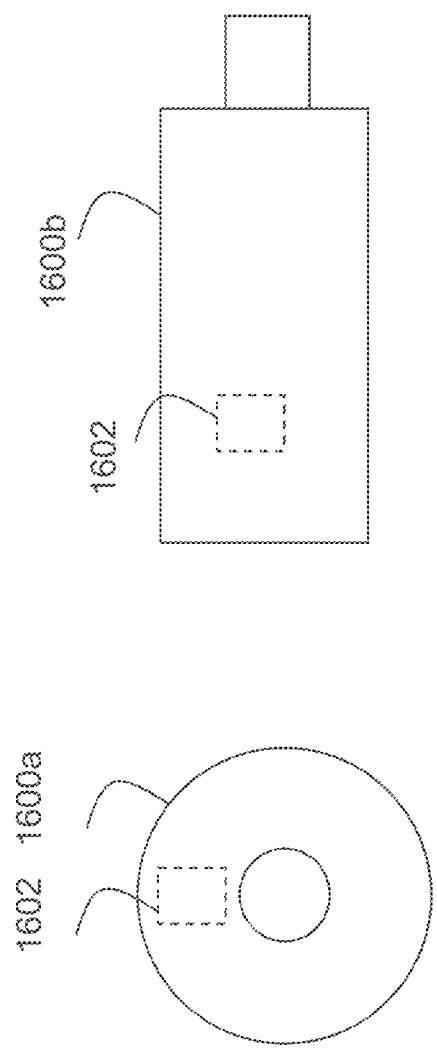

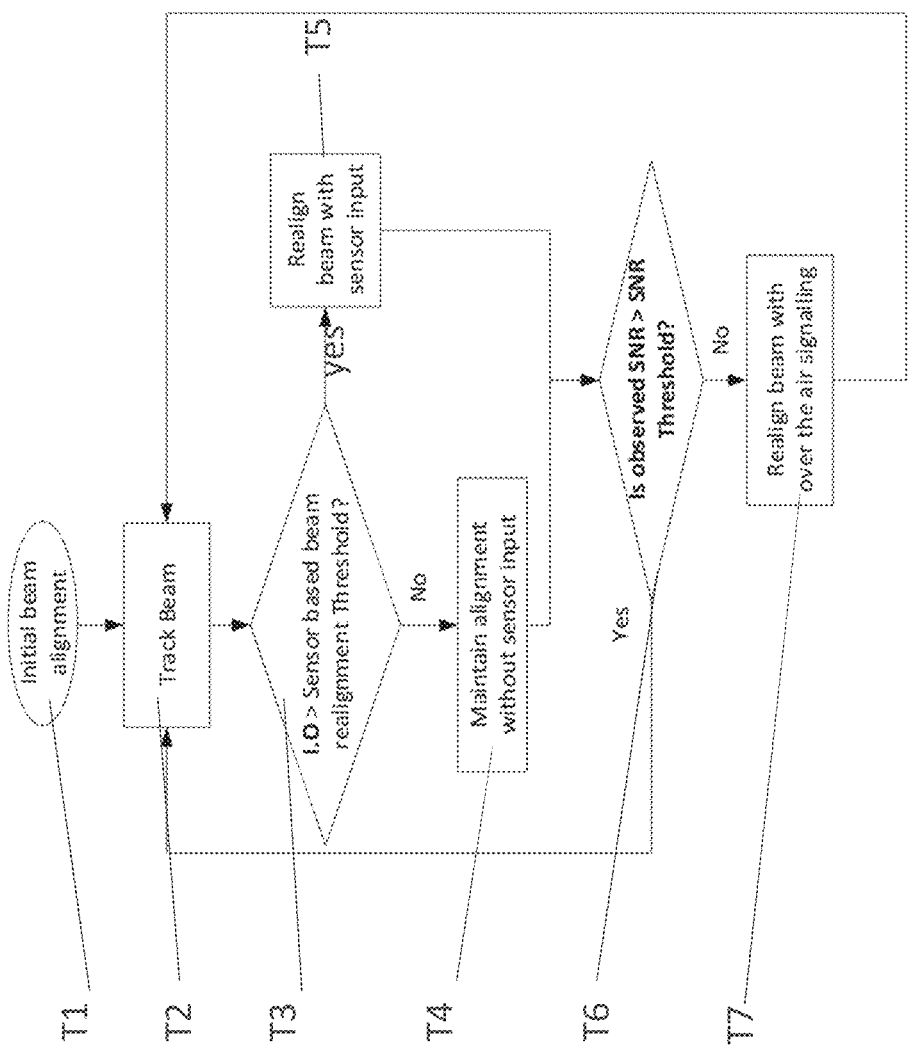

A1- When a communications device transitions from an inactive state to an active state, determine one or more antenna radiation beam directions for one or more antenna arrays of the communications device in dependence on movement information associated with the communications device and information from when the communications device was last in an active state.

Fig. 13

METHODS AND APPARATUS FOR DETERMINING BEAM DIRECTIONS AFTER INACTIVE PERIOD

CROSS-REFERENCE TO RELATED APPLICATIONS

This application is a national stage entry of International Application No. PCT/EP2019/059265, filed Apr. 11, 2019, entitled "METHODS AND APPARATUS FOR DETERMINING BEAM DIRECTIONS AFTER INACTIVE PERIOD" which is hereby incorporated by reference in its entirety.

FIELD OF THE DISCLOSURE

The present disclosure relates to an apparatus, methods, and computer programs and in particular but not exclusively for apparatus, methods and computer programs to be used in a communications system.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communications devices.

Access to the communication system may be by means of an appropriate communications device or terminal. A communications device is provided with an appropriate signal receiving and transmitting apparatus for enabling communications, for example enabling access to a communication network or communications directly with other communications device. The communications device may access a carrier provided by a station or access point, and transmit and/or receive communications on the carrier.

The communication system and associated devices typically operate in accordance with a given standard or specification which sets out what the various entities associated with the system are permitted to do and how that should be achieved.

SUMMARY

According to an aspect, there is provided a method comprising: when a communications device transitions from an inactive state to an active state, determining one or more antenna radiation beam directions for one or more antenna arrays of said communications device in dependence on movement information associated with said communications device and information from when the communications device was last in an active state.

The method may comprise comparing information associated with said one or more antenna radiation beam directions with one or more thresholds to determine if said determined one or more antenna radiation beam directions are to be used.

The method may comprise determining when said communications device transitions from the inactive state to the active state.

The information from when the communications device was last in the active state may comprise information about an angle of arrival of a transmission with respect to said one or more antenna arrays.

The information from when the communications device was last in the active state may comprise information about one or more antenna radiation beam directions used to one or more of receive signals and transmit signals.

The movement information may comprise movement information provided by one or more sensors of the communication device.

The movement information may comprise one or more of rotation information of the communication device, orientation information of said communications device, translation movement of the communications device and position information of said communications device.

The position information may comprise GNSS information.

The information about an angle of arrival may comprise one or more antenna radiation beam directions.

The active state may comprise a connected state.

The inactive state may comprise one of an idle state, a discontinuous transmission state and an inactive state.

According to another aspect there is provided an apparatus comprising at least one processor and at least one memory including computer code for one or more programs, the at least one memory and the computer code configured, with the at least one processor, to cause the apparatus at least to: when a communications device transitions from an inactive state to an active state, determine one or more antenna radiation beam directions for one or more antenna arrays of said communications device in dependence on movement information associated with said communications device and information from when the communications device was last in an active state.

The at least one memory and the computer code may be configured, with the at least one processor, to cause the apparatus to determine when said communications device transitions from the inactive state to the active state.

The at least one memory and the computer code may be configured, with the at least one processor, to cause the apparatus to compare information associated with said one or more antenna radiation beam directions with one or more thresholds to determine if said determined one or more antenna radiation beam directions are to be used.

The information from when the communications device was last in the active state may comprise information about an angle of arrival of a transmission with respect to said one or more antenna arrays.

The information from when the communications device was last in the active state may comprise information about one or more antenna radiation beam directions used to one or more of receive signals and transmit signals.

The movement information may comprise movement information provided by one or more sensors of the communication device.

The movement information may comprise one or more of rotation information of the communication device, orientation information of said communications device, translation movement of the communications device and position information of said communications device.

The position information may comprise GNSS information.

The information about an angle of arrival may comprise one or more antenna radiation beam directions.

The active state may comprise a connected state.

The inactive state may comprise one of an idle state, a discontinuous transmission state and an inactive state.

The apparatus may be provided in the communications device or may be the communications device.

According to an aspect there is provided an apparatus comprising circuitry configured to: when a communications device transitions from an inactive state to an active state, determine one or more antenna radiation beam directions for one or more antenna arrays of said communications device in dependence on movement information associated with said communications device and information from when the communications device was last in an active state.

The circuitry may be configured to determine when said communications device transitions from the inactive state to the active state.

The circuitry may be configured to compare information associated with said one or more antenna radiation beam directions with one or more thresholds to determine if said determined one or more antenna radiation beam directions are to be used.

The information from when the communications device was last in the active state may comprise information about an angle of arrival of a transmission with respect to said one or more antenna arrays.

The information from when the communications device was last in the active state may comprise information about one or more antenna radiation beam directions used to one or more of receive signals and transmit signals.

The movement information may comprise movement information provided by one or more sensors of the communication device.

The movement information may comprise one or more of rotation information of the communication device, orientation information of said communications device, translation movement of the communications device and position information of said communications device.

The position information may comprise GNSS information.

The information about an angle of arrival may comprise one or more antenna radiation beam directions.

The active state may comprise a connected state.

The inactive state may comprise one of an idle state, a discontinuous transmission state and an inactive state.

The apparatus may be provided in the communications device or may be the communications device.

According to an aspect there is provided an apparatus comprising means for: when a communications device transitions from an inactive state to an active state, determining one or more antenna radiation beam directions for one or more antenna arrays of said communications device in dependence on movement information associated with said communications device and information from when the communications device was last in an active state.

The means may be for determining when said communications device transitions from the inactive state to the active state.

The means may be for comparing information associated with said one or more antenna radiation beam directions with one or more thresholds to determine if said determined one or more antenna radiation beam directions are to be used.

The information from when the communications device was last in the active state may comprise information about an angle of arrival of a transmission with respect to said one or more antenna arrays.

The information from when the communications device was last in the active state may comprise information about one or more antenna radiation beam directions used to one or more of receive signals and transmit signals.

The movement information may comprise movement information provided by one or more sensors of the communication device.

The movement information may comprise one or more of rotation information of the communication device, orientation information of said communications device, translation movement of the communications device and position information of said communications device.

The position information may comprise GNSS information.

The information about an angle of arrival may comprise one or more antenna radiation beam directions.

The active state may comprise a connected state.

The inactive state may comprise one of an idle state, a discontinuous transmission state and an inactive state.

The apparatus may be provided in the communications device or may be the communications device.

According to an aspect there is provided a computer program comprising computer executable code which when run on at least one processor is configured to cause any of the previously described methods to be performed.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

According to another aspect, there is provided a non-transitory computer readable medium comprising program instructions stored thereon, said program instructions when run, determining, when a communications device transitions from an inactive state to an active state, one or more antenna radiation beam directions for one or more antenna arrays of said communications device in dependence on movement information associated with said communications device and information from when the communications device was last in an active state.

The computer instructions when run, may determine when said communications device transitions from the inactive state to the active state.

The computer instructions when run, may compare information associated with said one or more antenna radiation beam directions with one or more thresholds to determine if said determined one or more antenna radiation beam directions are to be used.

The information from when the communications device was last in the active state may comprise information about an angle of arrival of a transmission with respect to said one or more antenna arrays.

The information from when the communications device was last in the active state may comprise information about one or more antenna radiation beam directions used to one or more of receive signals and transmit signals.

The movement information may comprise movement information provided by one or more sensors of the communication device.

The movement information may comprise one or more of rotation information of the communication device, orientation information of said communications device, translation movement of the communications device and position information of said communications device.

The position information may comprise GNSS information.

The information about an angle of arrival may comprise one or more antenna radiation beam directions.

The active state may comprise a connected state.

The inactive state may comprise one of an idle state, a discontinuous transmission state and an inactive state.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Embodiments will now be described, by way of example only, with reference to the accompanying Figures in which:

FIG. 1 shows a schematic representation of a communication system;

FIG. 2 shows a schematic representation of a communications device;

FIG. 3 shows an apparatus of a base station;

FIG. 5 shows a schematic representation of a non-volatile memory media;

FIG. 9b shows a direction of arrival vector I aligned with a receiving beam direction vector 0 for the arrangement of FIG. 9a;

FIG. 11 shows a method of some embodiments;

FIG. 13 shows a method of some embodiments.

DETAILED DESCRIPTION OF THE FIGURES

Figure 4:
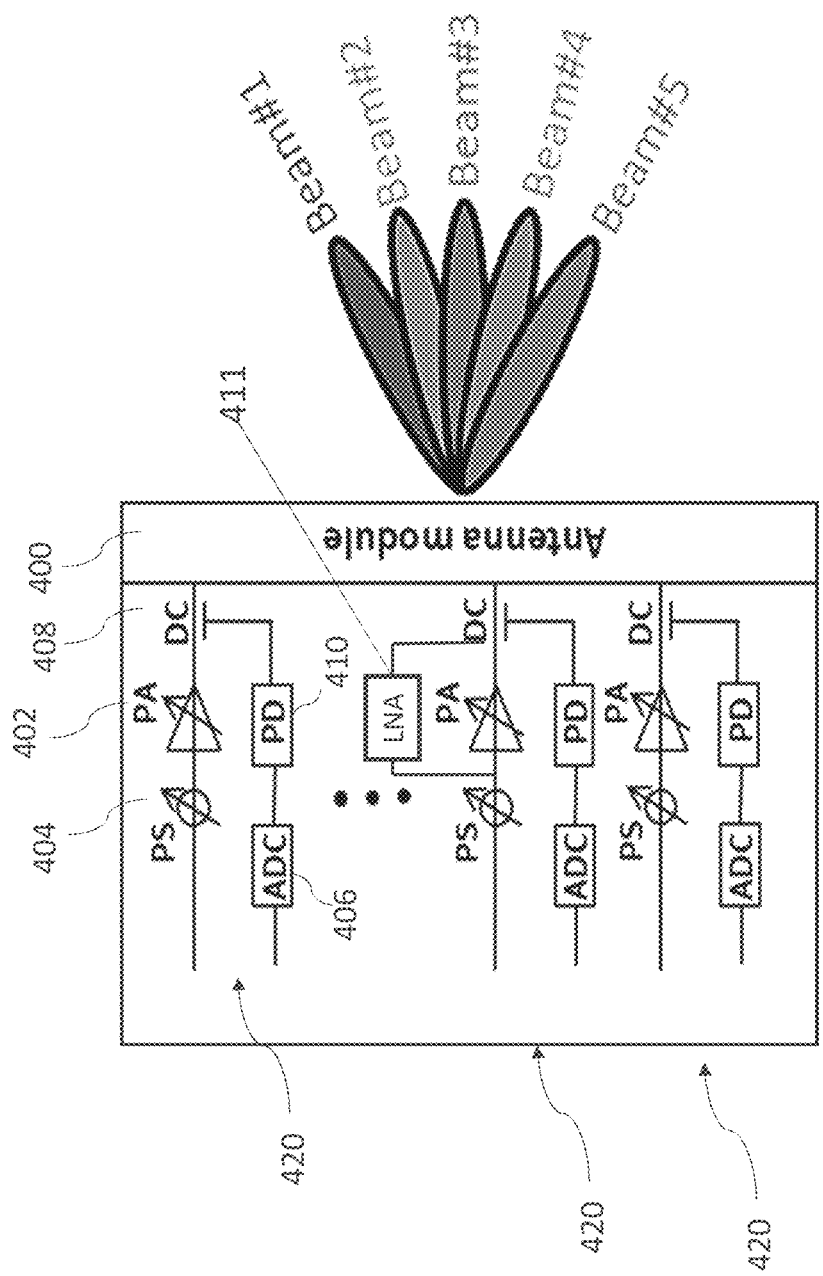
FIG. 4 shows part of a transceiver of the communications device.

In the following certain embodiments are explained with reference to communications devices capable of communication via a wireless cellular system and communication systems serving such communications devices. Before explaining in detail the exemplifying embodiments, certain general principles of a wireless communication system, access systems thereof, and communications devices are briefly explained with reference to FIGS. 1 to 4 to assist in understanding the technology underlying the described examples.

Reference is made to FIG. 1 which shows an example system 100 in which some embodiments may be provided. The system may be a wireless communications system. In a wireless communication system 100, such as that shown in FIG. 1, communication devices or user equipment (UE) 102, 104, 105 are provided. This communications devices will be referred to as UEs but it should be appreciated that the device may be any suitable communications device and the term UE is intended to cover any such device. Some examples of communications devices are discussed below and as used in this document the term UE is intended to cover any one or more of those devices and/or any other suitable device.

The UEs may be provided wireless access via at least one base station (or similar wireless transmitting and/or receiving node or point. In some embodiments, there may be device to device communication such as between communication devices 102 and 104

In FIG. 1, there are base stations 106 and 107 which serve relatively large cells. Smaller base stations 116, 118 and 120 may also be provided. The smaller base stations 116, 118 and 120 may be pico or femto level base stations or the like. In some embodiments, the smaller base stations may not be provided.

One or more of the base stations may communicate with a network 113 via one or more network functions 112. One or more of the base stations may communicate with the network via one or more other base stations. For example one or more smaller base stations may communicate with a network via one or more of the large base stations.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). One 3GPP based development is often referred to as the long term evolution (LTE) of the Universal Mobile Telecommunications System (UMTS) radio-access technology. Some developments of LTE are referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs). Another example of a suitable communications system is the 5G or New Radio (NR) concept. Base stations of NR systems may be known as next generation Node Bs (gNBs). The base station may be a ng-eNB. Other examples of radio access system comprise those provided by base stations of systems that are based on technologies such as wireless local area network (WLAN) and/or WiMAX (Worldwide Interoperability for Microwave Access). A base station can provide coverage for an entire cell or similar radio service area.

FIG. 2 illustrates an example of a communications device 300, such as the wireless communications device 102, 104 or 105 shown on FIG. 1. The wireless communications device 300 may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, machine-type communications (MTC) devices, IoT type communications devices or any combinations of these or the like.

The device 300 may receive signals over an air or radio interface 307 via appropriate apparatus for receiving and may transmit signals via appropriate apparatus for transmitting radio signals. In FIG. 2 transceiver apparatus is designated schematically by block 306. The transceiver apparatus 306 may be provided for example by means of a radio part and associated antenna arrangement. The antenna arrangement may be arranged internally or externally to the mobile device. In some embodiments, a plurality of transceivers may be provided by the transceiver apparatus.

The wireless communications device 300 may be provided with at least one processor 301 and at least one memory. The at least one memory may comprise at least one ROM 302a and/or at least one RAM 302b. The communications device may comprise other possible components 303 for use in software and hardware aided execution of tasks it is designed to perform, including control of access to and communications with access systems and other communications devices. The at least one processor 301 is coupled to the at least one memory. The at least one processor 301 may be configured to execute an appropriate software code 308 to implement one or more of the following aspects. The software code 308 may be stored in the at least one memory, for example in the at least one ROM 302b.

The processor, storage and other relevant control apparatus can be provided on an appropriate circuit board and/or in chipsets. This feature is denoted by reference 304.

The device may optionally have a user interface such as key pad 305, touch sensitive screen or pad, combinations thereof or the like.

Optionally one or more of a display, a speaker and a microphone may be provided depending on the type of the device.

An example apparatus 200 is shown in FIG. 3. The apparatus shown in FIG. 3 may be provided in a base station. The apparatus comprises at least one memory. The at least one memory may be at least one random access memory (RAM) 211a and/or at least one read only memory (ROM) 211b, at least one processor 212, 213 and an input/output interface 214. The at least one processor 212, 213 is coupled to the RAM 211a and the ROM 211b. The at least one processor 212, 213 may be configured to execute an appropriate software code 215 to implement one or more of the following aspects. The software code 215 may be stored in the ROM 211b.

Communication protocols and/or parameters which shall be used for the connection are also typically defined. The communications devices may access the communication system based on various access techniques.

In some embodiments, multiple antennas and/or a plurality of antenna arrays may be provided. By way of example only, multiple antennas and/or a plurality of antenna arrays may be used in 5G NR both for the gNB and the UE. Using multiple antennas and/or a plurality of antenna arrays may provide the option to increase system performance (for example throughput and coverage) by using an additional antenna gain provided by joint beamforming of the antenna elements in these antenna arrays.

In some embodiments, the antenna arrays may be used with the mmW frequency range of 5G NR (mmWave—e.g. above 6 GHz). In some embodiments, the range of frequencies may be between 24 to 100 GHz (or even up to 114 GHz). Some embodiments may be used with these frequency ranges. It should be appreciated that in other embodiments, frequencies below 24 GHz may be used with some embodiments.

The use of beamforming may compensate for the increased free space loss at the high frequencies. The beams can be applied at the transmitter as well as the receiver. In other words, beamforming may be used for transmitting signals and receiving signals. In some embodiments, the beamforming may be considered to be reciprocal in the transmitting and receiving directions. Antenna arrays may have a reduced radiation beam width, which may limit the area/coverage. The reduced coverage may be counteracted by utilizing beam steering where antenna array radiation beam is tilted in the direction of the gNB or the UE.

It has been proposed to use an open loop beam steering mechanism for the gNB and the UE. This mechanism may utilize predefined codebooks to change the spatial direction (azimuth and/or longitude) of the beam generated by the antenna array. The codebooks at the device may be device dependent. The codebooks may be determined in idealized free space conditions. The codebooks may contain information of the different phase and/or amplitude settings for the different antenna elements in the array, to steer the beam in different spatial directions.

Reference is made to FIG. 4 which shows the Tx part of the RF front end, the receive path will use the same antenna array but switch to a low noise amplifier (LNA) 411 instead of the PA for a TDD system. (The LNA would be provided in each path for each antenna element but for clarity is only schematically shown with respect to the second path). One or more antenna arrays 400 is provided. In this example, the receive RX paths use the same antenna element as the transmit TX path. This may be in one or both TDD (time division duplex) and FDD (frequency division duplex) operation modes. This means that a reciprocal assignment of the most suitable antenna elements for RX path may be made based on those detected from TX path.

In the schematic example shown in FIG. 4, the LNA of the receive path is arranged in parallel with the PA. It should be appreciated that this arrangement may be schematic and one or more different elements may be provided. For example, a duplex filter may be arranged between the PA and the LNA on the one hand and the antenna element on the other hand. A separate PS may be provided in the receive path in some arrangements. A switch may be provided between the PA and the LNA on the one hand and the PS (where it is used for both the receive path and the transmit path) on the other hand. The transmit and receive paths may be implemented in any suitable way.

Each antenna element in the array has its own dedicated circuitry 420. The antenna array is configured to generate a beam pattern comprising one or more beams where the shape, size and number of beams is controlled by the phase and gain used for each of the antennas. (It should be appreciated that in other embodiments, two or more antenna elements may share circuitry).

The circuitry may comprise an analog to digital converter ADC 406, a power detector PD 410 and a directional coupler DC 408. The circuitry 420 may comprises a power amplifier PA 402 and a phase shifter PS 404. The PA 402 and PS 404 are arranged in series with the PS upstream of the PA. However, in other embodiments, the PA may be upstream of the PS. Changing the phase of the phase shifter PS and/or the gain of the power amplifier PA can be used to control the radiation pattern of the arrays, to increase the gain in a specific direction towards the gNB or another device and/or to create one or more nulls towards other interfering devices. The PA is used to control the gain and the phase shifter is used to control the phase for a respective antenna.

Figure 6B:
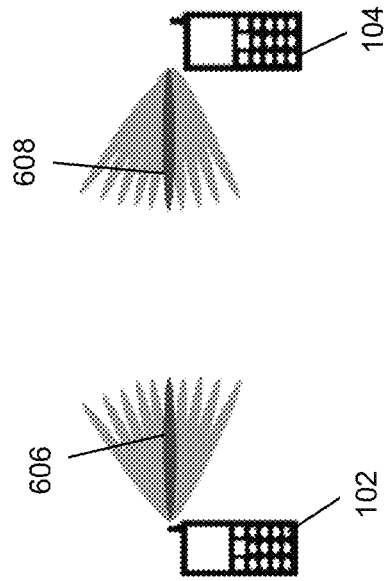
FIG. 6b shows beam alignment in a communication device/communication device scenario.
Figure 6A:
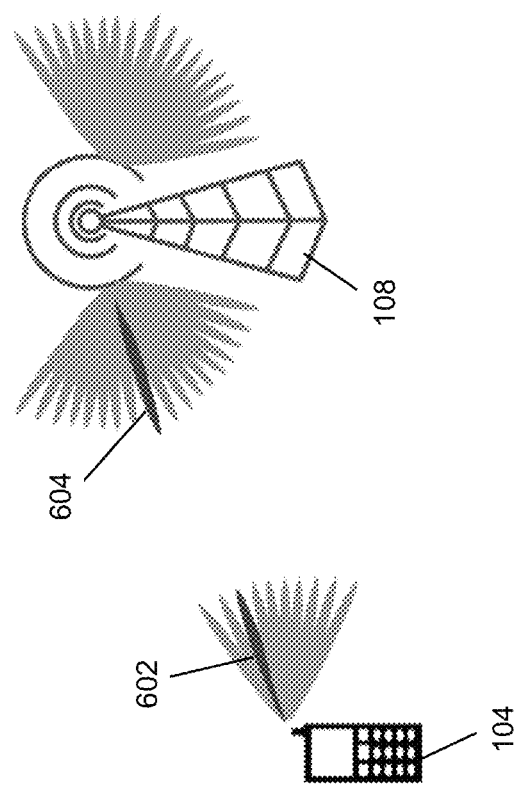
FIG. 6a shows beam alignment in a communication device/base station scenario.

In some embodiments, so that two network devices are able to establish a communication link they need to align their beams, as described in relation to FIGS. 6a and 6b. In a cellular setting (shown in FIG. 6a) where links are established between a communications device such as a UE 104 and a base station 108 such as a gNB, this Tx/Rx beam alignment may be performed during the initial access. For example, this may be performed as part of the procedure that allows the UE to transition from an idle state to a connected state. As can be seen the beam alignment aims to align a beam 602 of the UE 104 in the same direction as a beam 604 of the base station 108.

In the case of device-to-device (side link) communication (shown in FIG. 6b) between two communication devices such as two UEs 102 and 104, the beam alignment may be done in a blind search manner, assisted by the network and/or by a third device. As can be seen the beam alignment aims to align a beam 606 of the UE 102 in the same direction as a beam 608 of the UE 104.

When there is an active communication link in either of the scenarios shown in FIG. 6a or 6b, the beams at the transmitter and receiver may need to change. This may be caused by the movement of the communications device and/or changes in propagation conditions (e.g. obstacles and reflections), among other reasons. When the required beam alignment changes are small, the beam tuning procedures (i.e. the selection of nearby beams to test if these provide better signal quality) may be enough to maintain the communication link.

To minimize energy consumption the communications devices may enter a discontinuous transmission (DTX) regime or transition to lower energy consumption states such as an idle or inactive mode. The idle or inactive mode may be RRC (radio resource control) idle mode or RRC inactive mode. When in this mode, there may be more significant changes related to the UE position and/or orientation. This may lead to the receiver and transmitter beams becoming misaligned, as shown in Figure.

Figure 7:
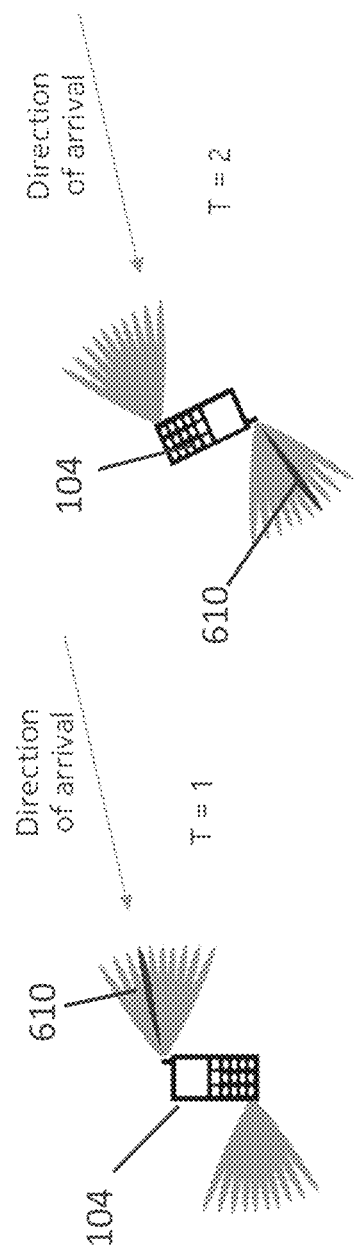
FIG. 7 shows a scenario where an orientation of the communication device changes while the communication device is in an inactive state.

FIG. 7 show a direction of arrival of a transmission at a UE 104 from a transmitting device (a base station or another device). At time T=1, the beam 610 is aligned with the direction of arrival. At time T=2, the orientation of the UE has changed and the direction of arrival is unchanged so that the beam is no longer aligned with the direction of arrival.

In either of the examples shown in FIG. 7, in the absence of any prior information, new blind beam alignment procedures may have to take place. This may result in one or more of the following disadvantages including the associated signaling overhead, additional power expenditure and user experience disruption (for example due to shorter battery lifetimes and/or latency on the reestablishment of the communication link).

Some embodiments may use information available at the UE to perform the connection reestablishment and the associated beam alignment. In some embodiments, this may improve one or more of signaling, latency and power efficiency. Information available at the UE may comprise one or more of information from sensors in the UE and last observed angles of arrival. The sensors may for example be inertial sensors or any other suitable sensor.

Some examples of initial beam management procedures will now be described. There are various different beam management procedures which can be used to determine an initial beam alignment. Beam alignment needs to be achieved before an actual communication can take place although the beams which are used can be refined during the communication.

A communication device may make measurements with respect to one or more transmitted beams from a transmission reception point TRP to support the selection of the TRP TX beams and/or the UE RX beams. For beam forming at the TRP, there may be an inter/intra TRP TX beam sweep from a set of different beams. For beam forming at the UE, the UE may include a UE RX beam sweep from a set of different beams.

Alternatively or additionally, the TRP provides a TX beam. The UE will measure that TX beam using a plurality of RX beams. The TRP TX beam is repeated over several time intervals and the UE sweeps its RX beam across the intervals.

Beam refinement may be provided using narrower beams. This may be after a wider beam has been selected for the initial communication.

Whenever the beam is misaligned beyond a certain threshold, then the initial access procedures (e.g. RACH random access channel procedure) need to be executed.

Some embodiments may use information available in the UE to modify a beam alignment. This may be used in the situation where a communications device moves from a less active state to a more active state. The more active mode may be a connected mode. The less active state may be an idle mode, an inactive mode, and/or a DTX (discontinuous transmission) mode. The information may be from one or more sensors. The sensors may be any suitable sensor. The one or more sensors may be inertial sensors provided in the UE and/or positional information sensors (such as global navigation satellite system GNSS information). By way of example there may be one or more sensors such as a GNSS sensor, a compass sensor and/or a gimbal.

The information available in the UE may be used to re-establish beam alignment when the UE transitions from the less active state to the more active state. The information may be used in conjunction with information such as the recorded angle of arrival AoA of a transmission from the last time the UE was in the more active state (e.g. the RRC connected state) and allow the UE to re-transition to the more active state (e.g. RRC connected state).

As mentioned previously, the one or more sensors may provide information such as position information, rotation information and/or orientation information. The one or more sensors may measure periodically the position, rotation and/or orientation of the communication device against an absolute referential. This absolute referential may be used by the communication device to determine its current position, rotation and/or orientation. The communication device's absolute referential can be regarded as a reference point in space or coordinate system that is used by the communications device to determine its position, rotation and/or orientation.

Figure 9B:
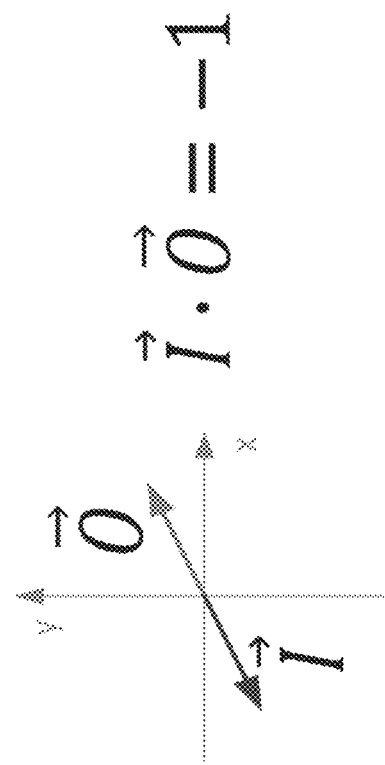
Figure 9A:
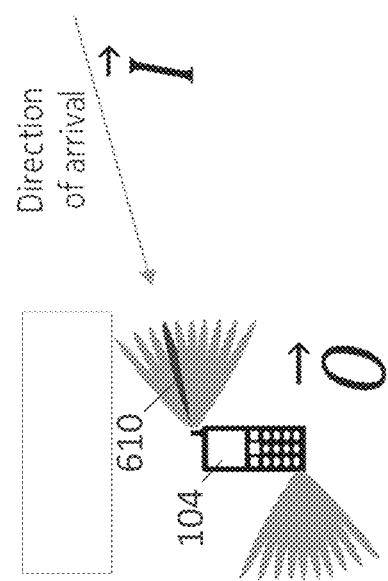
FIG. 9a shows a receiving beam of a communications device aligned with a direction of arrival.

The position, rotation and/or orientation information may be used by the communication device to align its transmitting and receiving beam towards the angle of arrival. In this regard reference is made to FIGS. 9a and 9b. FIG. 9a shows a UE 104 with a beam 610 aligned with the direction of arrival. As shown in FIGS. 9a and 9b, the receiving beam direction is indicated by the vector O. The direction on the incoming signal is indicated by the vector I. The vectors I and O are unit circle vectors (i.e. they have norm 1). The dot product of two vectors is −1 when they are aligned but with opposite directions. Thus, when the two vectors are aligned but with opposite directions as shown in FIG. 9b, then the dot product of the two vectors will be −1. The dot product of the two vectors represents how aligned to two vectors are.

Figure 8A:
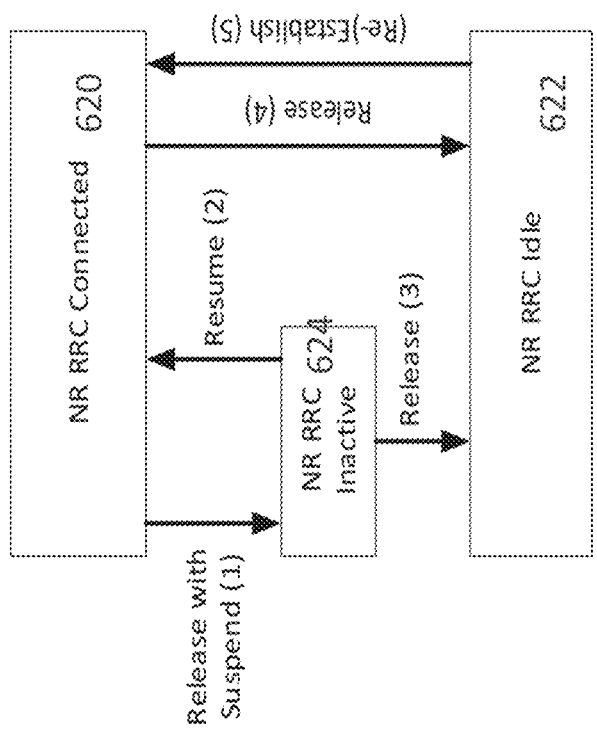
FIG. 8a shows an example of different states of a communication device and transitions therebetween.
Figure 8B:
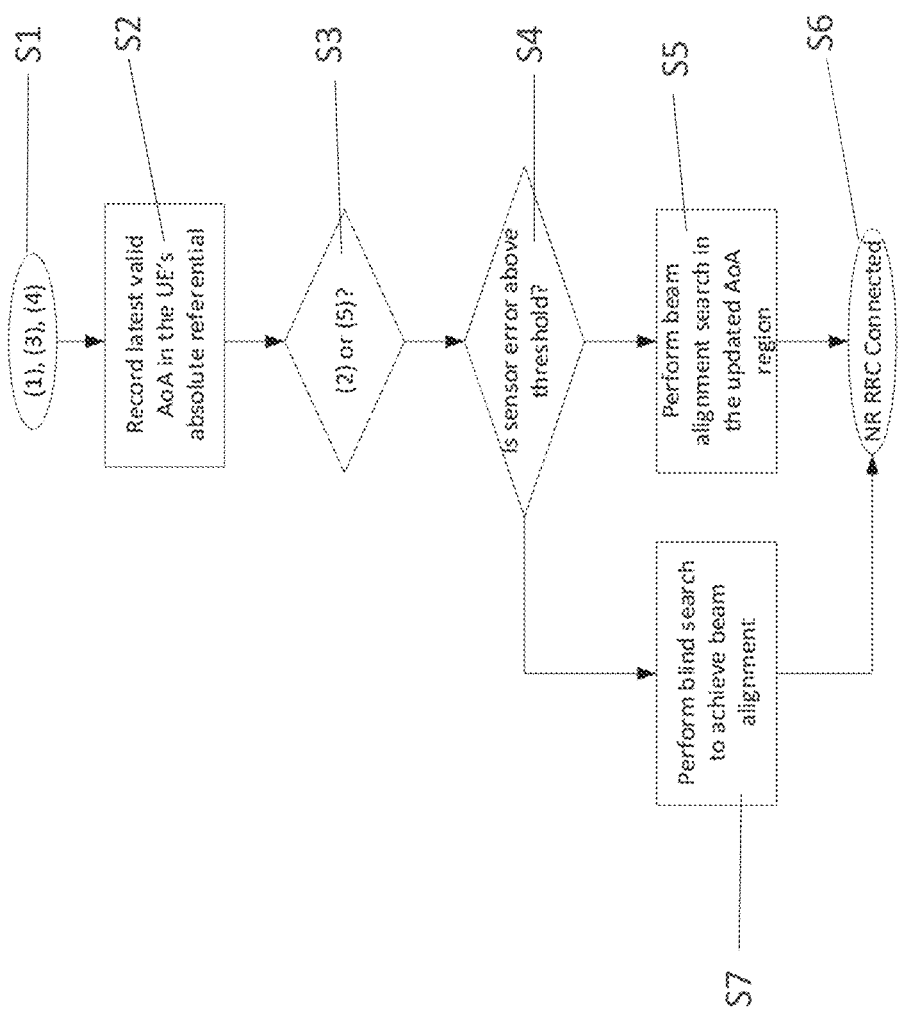
FIG. 8b shows a method of some embodiments.

Reference is made to FIGS. 8*a* and 8*b*. Reference is made to FIG. 8*a* which schematically shows the transitions between activity states of the communication device. In this example, there is a NR RRC connected state 620, a NR RRC idle state 622 and a NR RRC inactive state 624.

A first transition (1) is where there is a release with suspend from the NR RRC connected state 620 to the NR RRC inactive state 624.

A second transition (2) is where there is a resume from the NR RRC inactive state 624 to the NR RRC connected state 620.

A third transition (3) is where there is a release from the NR RRC inactive state 624 to the NR RRC idle state 622.

A fourth transition (4) is where there is a release from the NR RRC connected state 620 to the NR RRC idle state 622.

A fifth transition (5) is where there is an establish or reestablish from the NR RRC idle state 622 to the NR RRC connected state 620.

The numbering of the transitions does not reflect any particular order in which these transitions occur.

Reference is made to FIG. 8*b* which shows a method of some embodiments provided in a communications device.

In step S1, one of the first (1), third (3) or fourth (4) transitions discussed in relation to FIG. 8*a* is determined to have occurred.

In step S2, a latest valid AoA or similar information is stored in a data store or memory of the communications device. In this step, a record of the latest valid AoA upon transition from RRC connected to RRC idle or RRC inactive state is determined.

In step S3 one of the second (2) and fifth (5) transitions discussed in relation to FIG. 8*a* is determined to have occurred. This may be determined by an apparatus of the communications device. There is a transition from RRC idle mode or RRC inactive mode to RRC connected mode. The last known AoA and a current UE position is used. This may be an absolute position or a relative position of the UE. The UE position may be defined in terms of one or more position, rotation and orientation. This may be with respect to the last known AoA used.

In step S4, the sensor error is compared to a threshold. This sensor error refers to the cumulative error that sensor gets every time that it measures a phenomenon. An example is that each time the UE rotation is measured the measured value is: actual rotation + or − an error (e.g. a percentage of the measured value).

If the sensor error is above the threshold, then the next step is step S7 in which a blind search is performed to achieve beam alignment.

If the sensor error is below the threshold, then the next step is step S5. In this step, a beam alignment search is performed in the updated AoA region.

Steps S5 and S7 are both followed by step S6 in which the UE enters the RRC connected state.

In some embodiments, a sensor aided beam alignment is provided while in RRC connected state.

It should be appreciated that some embodiments may be used for communications between a UE and an access point such as base station and/or for communications between two UEs or similar devices.

Some embodiments may be used where there is channel reciprocity in terms of AoA.

In the Device-to-Infrastructure (D2I) (that is communication between the UE and an access node such as a base station) setting, after the UE has successfully transitioned to RRC connected state, the UE keeps track of the Angle of Arrival (AoA) associated with the downlink signal and the absolute referential of the UE.

When a UE is connected to two or more TRPs, the UE keeps track of each of the AoAs associated with each TRP. When the UE transitions to RRC idle or RRC inactive, the UE keeps a record of all the latest AoAs, so that when the UE needs to transition again to RRC connected mode, the UE attempts first the beam alignment with those AoAs, and only if not successful then proceeds with the standard blind beam search.

In the D2D scenario, after the UEs have both transitioned to RRC connected state, both UEs keep track of their respective AoAs associated with the side link signal and their respective absolute referential. When the UEs transition to RRC idle or inactive mode (with respect to the D2D connection), both UEs keep a record of the latest AoA. When the UEs need to transition again to RRC connected mode (with respect to the D2D connection), the two UEs first attempt the beam alignment with the recorded AoA. The procedure is as discussed in relation to FIG. 8*a* but it occurs at both UEs.

Figure 10A:
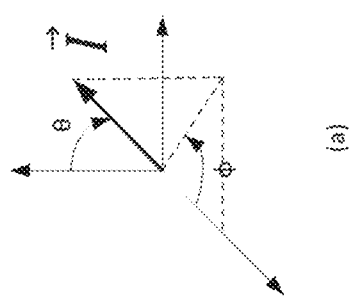
FIG. 10a shows theta and phi angles associated with the I vector.
Figure 10B:
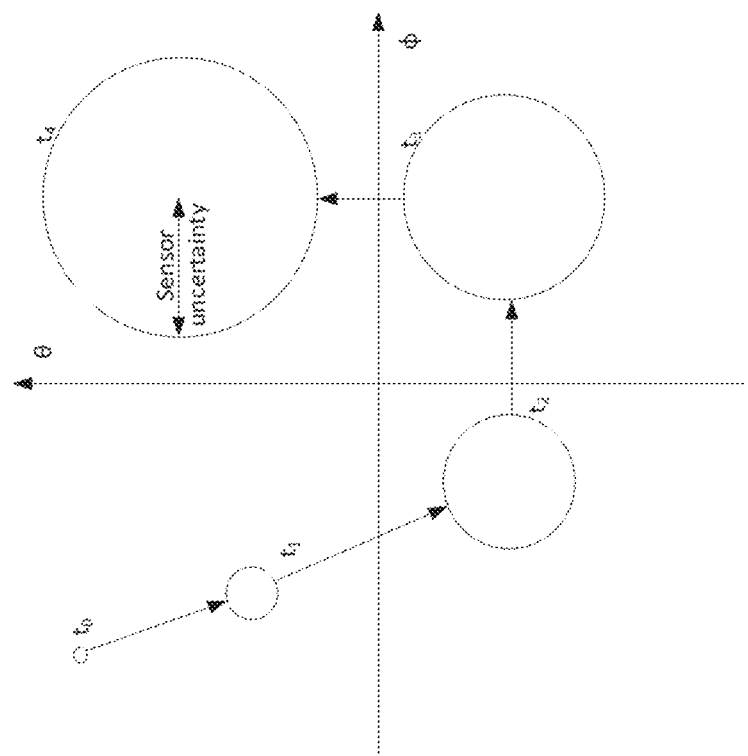
FIG. 10b shows an increasing uncertainty with time over information provided by one or more sensors.

Reference is made to FIGS. 10*a* and 10*b*. Each beam of the communications device is characterized by a different O vector. In other words, the beam has a theta and phi angle. The theta and phi angles in FIGS. 10*a* and 10*b* represent the direction and/or orientation of the vector representing the angle of arrival. The sensor uncertainty in FIG. 10*b* represents the cumulative sensor errors which are detected by the sensors, which if not corrected by an external calibration source introduce more and more errors. An example of this is the case where even when a communication device is in rest (i.e. sitting in a table) there may be fluctuations being reported by its sensors.

These errors may be compensated at least in part by the application of filters (such as a Kalman filter or the like). Alternatively or additionally, an external source may providing some calibration.

The beam alignment region is shown in FIG. 10*b*. Where the communication device moves (position, rotation and/or orientation) over time and due to the sensor uncertainty (i.e. accumulated sensor errors) this region grows in size.

The beam alignment search may be performed by using the search region to restrict (or select) the beams that are tested while doing the alignment. This may correspond to the case where a codebook is used. Another approach may to do a sweep of the theta and phi angles by directing the UE's outgoing beam in that direction.

When the procedure is not successful, the UEs revert to the blind beam alignment. When at least one UE moves in space, when re-aligning the beam a testing of possible beams may take place based on the direction of movement.

The AoA information may only be useful within a period of time, which is dependent on whether it is a D2D or D2I scenario and the mobility conditions of the UE (e.g. the recorded AoA is expected to be reliable and relevant for a static UE but not particularly for a UE is that is moving at high speed).

The AoA information may be provided and/or stored in any suitable way. For example, this information may be stored in terms of one or more of the theta and phi angles discussed in relation to FIG. 10*a*, the current position of the communications device, the orientation of the communication device and the rotation of the communication device. Identity information of the associated beam may be stored.

In some embodiments, the AoA information may be stored for each beam or for a plurality of beams.

In some embodiments, the AoA information may be stored with respect to one beam (a reference beam) and information for one or more other beams may be stored with respect to that one beam.

When in an RRC connected state, the UE can still take advantage of the in-device sensors to keep beam alignment. In FIG. 8, the proposed procedure occurs when the device has already transitioned to RRC_Connected state, since at this point an initial beam alignment has already been established. Then as the UE moves (e.g. 3D rotation and/or translation in space), the UE uses the information from its sensors to aid beam tracking, reducing the occurrence of the relatively high resource requiring signaling beam recovery procedures such as those which are required to provide the initial beam selection.

Some embodiments allow a transition from idle or inactive to connected states, by taking advantage of the device sensors to perform beam alignment while taking into account one or more measurements of the one or more sensors.

Reference is made to FIG. 11 which shows a method of some embodiments with sensor aided beam tracking. In some embodiments, the input from the sensors is only used when the value of I·O is above a predefined threshold. This may avoid unnecessary corrections of the outgoing UE beam due to fluctuations/drift of the UE's sensors. The method of FIG. 11 may be used when the device is in an active mode such as a RRC connected state and initial beam alignment has been performed.

In step T1, the initial beam alignment is performed. This may use any suitable method.

In step T2, the beam is tracked.

In step T3 the sensor based realignment is compared to a threshold and depending on the comparison, the next step is step T4 or T5.

In step T4, if it determined that the sensor based realignment is less than the threshold then the beam alignment is maintained and the sensor input is not used.

In step T5, if it determined that the sensor based realignment is greater than the threshold then the beam alignment is updated to realign the beam in dependence on the sensor input.

In step T6 follows step T4 and step T5. In this step it is determined if the observed signal to noise ratio SNR is greater than a SNR threshold.

In step T7, if it determined that the observed signal to noise ratio SNR is not greater than the SNR threshold, then the beam is realigned with the over air signaling with the base station or other device. Step T7 is then followed by step T2.

If it determined that the observed signal to noise ratio SNR greater than the SNR threshold, then the next step is step T2.

Thus in this example method, when the observed SNR (which may be over an observation period to smooth out the deep fades) falls below a certain threshold, even after beam alignment, then a fall back to the signaling-based beam alignment takes place. This may use any of the previously described techniques.

Simulations have shown that with compensation provided by the UE from for example sensors, the need to trigger signaling based beam realignment is reduced.

Figure 12:
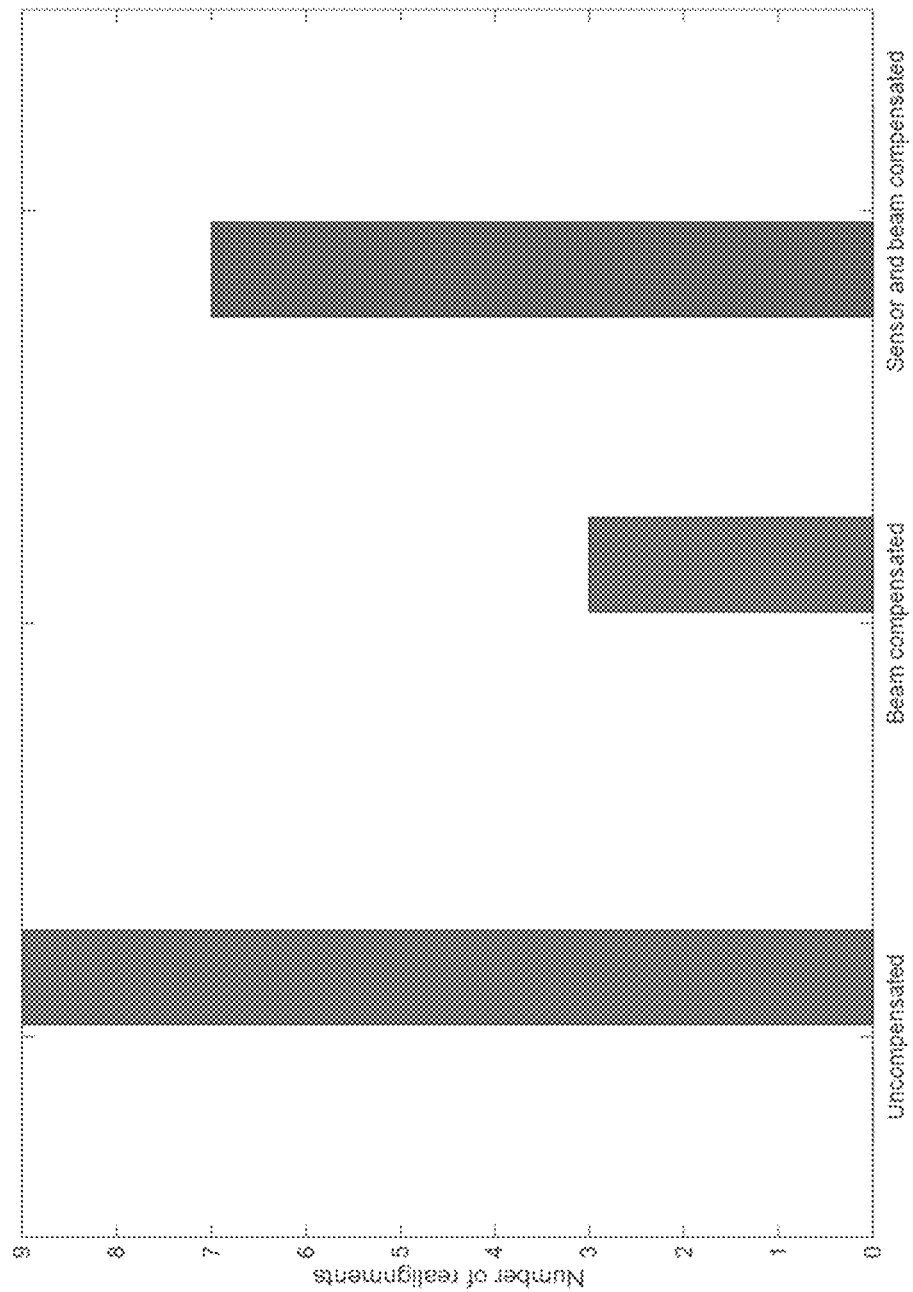
FIG. 12 shows a graph plotting number of realignments with respect to various beam alignment scenarios for a set of simulation results.

FIG. 12 shows for one set of simulations the number of realignments required. The plot includes three categories:

Uncompensated—This is where whenever there is a beam misalignment, the communication device has to go over all the signaling exchanges to establish beam alignment.

Beam compensated—This is where the communication device is able to compensate beam misalignments without requiring signaling exchanges to establish beam alignment, as long the beam misalignment is within some degrees.

Sensor and beam compensated—This is where the communication device does not require signaling exchanges related to beam alignment, since it takes advantage of the measurements of one or more of the sensors. This is as outlined previously.

The left column in each category represents "sensor aided beam alignment". For the first two categories, there is no sensor aided beam alignment. The right column represents "signaling aided beam realignment". The sensor aided beam alignment is associated with a first threshold and the signaling aided beam alignment is associated with a second threshold. In some embodiments, the signaling aided beam alignment is associated with a higher threshold than the sensor aided beam alignment. This is because the signaling aided beam alignment is resource intensive and should only be carried out when necessary. The sensor aided beam alignment is not so resource intensive and can be carried out more frequently. In the simulations associated with FIG. 12, the need for signaling aided beam alignment was in this case avoided by the use of the sensor aided beam alignment.

Signaling aided beam realignment, may have one or more different degrees of signaling aided beam alignment. In some embodiments, the most signaling intensive case may be where the UE reaches the radio link failure (RLF) state and the UE attempts the initial access procedure (e.g. the RACH procedure and signaling to transition again to RRC connected).

A method of some embodiments will now be described with reference to FIG. 12.

In step A1, the method comprises, when a communications device transitions from an inactive state to an active state, determining one or more antenna radiation beam directions for one or more antenna arrays of said communications device in dependence on movement information associated with said communications device and information from when the communications device was last in an active state.

The method may be performed in an apparatus of the communications device or by the communications device. Some embodiments may minimize the power consumption, especially in idle mode when realignment for paging is required.

Some embodiments may minimize the UE power consumption for a transition from an idle or inactive mode to a RRC connected mode Some embodiments may minimize the UE access time for a transition from an idle and inactive mode to a RRC connected mode. This may be useful in low latency industrial use cases, Some embodiments may maintain beam management during an RRC connected mode.

Some embodiments have been described in the context of a 5G system. However, this is by way of example only and other embodiments may be used with any other suitable wireless communication systems.

Some embodiments have been described in the context of particular active and inactive states. However these are by way of example only and other embodiments may be used with any other suitable active and inactive states.

FIG. 5 shows a schematic representation of non-volatile memory media 1600a (e.g. computer disc (CD) or digital versatile disc (DVD)) and 1600b (e.g. universal serial bus (USB) memory stick) storing instructions and/or parameters 1602 which when executed by a processor allow the processor to perform one or more of the steps of any of the methods of any of the embodiments.

It is noted that while the above describes example embodiments, there are several variations and modifications which may be made to the disclosed solution without departing from the scope of the present invention. These aspects may be transposed to other radio access technology systems other than those described purely by way of example.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., in FIG. 8*b*, FIG. 11 or FIG. 13 may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
 (a) hardware-only circuit implementations (such as implementations in only analogue and/or digital circuitry);
 (b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example an integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. A method comprising:
when a communications device transitions from an inactive state to an active state, determining one or more antenna radiation beam directions for one or more antenna arrays of said communications device in dependence on movement information associated with said communications device and information from when the communications device was last in an active state.

2. The method as claimed in claim 1, comprising:
comparing information associated with said one or more antenna radiation beam directions with one or more thresholds to determine if said determined one or more antenna radiation beam directions are to be used.

3. The method as claimed in claim 1, wherein said information from when the communications device was last in the active state comprises information about an angle of arrival of a transmission with respect to said one or more antenna arrays.

4. The method as claimed in claim 1, wherein said movement information comprises movement information provided by one or more sensors of the communications device.

5. The method as claimed in claim 1, wherein said movement information comprises one or more of rotation information of the communications device, orientation information of said communications device, translation movement of the communications device and position information of said communications device.

6. The method as claimed in claim 3, where said information about the angle of arrival comprises one or more antenna radiation beam directions.

7. The method as claimed in claim 1, wherein said active state comprises a connected state.

8. The method as claimed in claim 1, wherein said inactive state comprises one of an idle state, a discontinuous transmission state or other inactive state.

9. An apparatus, comprising:
at least one processor; and
at least one memory including computer program code;

the at least one memory and the computer program code configured to cause the apparatus at least to:

when a communications device transitions from an inactive state to an active state, determine one or more antenna radiation beam directions for one or more antenna arrays of said communications device in dependence on movement information associated with said communications device and information from when the communications device was last in an active state.

10. The apparatus as claimed in claim 9, wherein the at least one processor and the computer program code are configured to cause the apparatus to compare information associated with said one or more antenna radiation beam directions with one or more thresholds to determine if said determined one or more antenna radiation beam directions are to be used.

11. The apparatus as claimed in claim 9, wherein said information from when the communications device was last in the active state comprises information about an angle of arrival of a transmission with respect to said one or more antenna arrays.

12. The apparatus as claimed in claim 9, wherein said movement information comprises movement information provided by one or more sensors of the communications device.

13. The apparatus as claimed in claim 9, wherein said movement information comprises one or more of rotation information of the communications device, orientation information of said communications device, translation movement of the communications device and position information of said communications device.

14. The apparatus as claimed in claim 11, where said information about the angle of arrival comprises one or more antenna radiation beam directions.

15. The apparatus as claimed in claim 9, wherein said active state comprises a connected state.

16. The apparatus as claimed in claim 9, wherein said inactive state comprises one of an idle state, a discontinuous transmission state or other inactive state.

17. The apparatus as claimed in claim 9, wherein the at least one processor and the computer program code are configured to cause the apparatus to:

compare information associated with said one or more antenna radiation beam directions with one or more thresholds to determine if said determined one or more antenna radiation beam directions are to be used.

* * * * *